J. PRUETTE.
Carriage-Hub.
No. 24,955.
Patented Aug. 2, 1859.
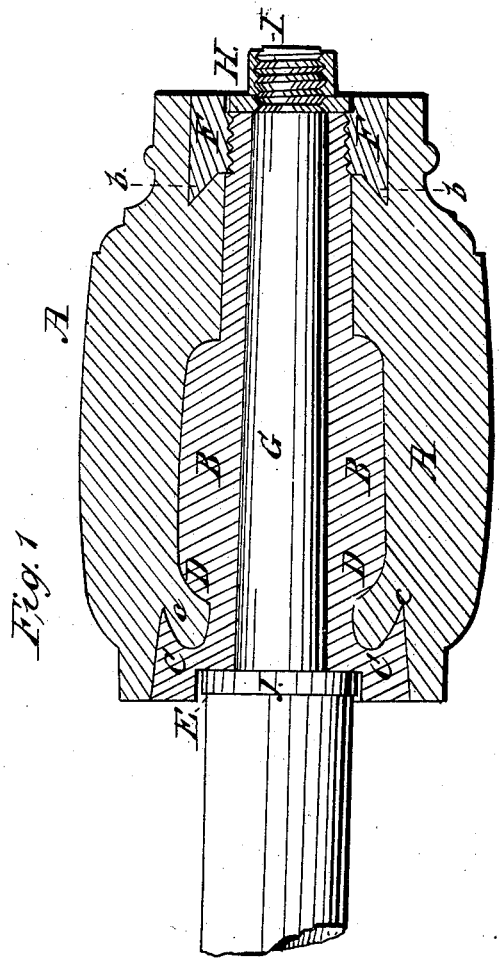
Witnesses:
Oramel Colkin
Jon H Fitch
Inventor:
Jesse Pruette

UNITED STATES PATENT OFFICE.

JESSE PRUETTE, OF AURORA, ILLINOIS.

CARRIAGE-HUB.

Specification of Letters Patent No. 24,955, dated August 2, 1859.

*To all whom it may concern:*

Be it known that I, JESSE PRUETTE, of Aurora, in the county of Kane and State of Illinois, have invented a new and useful Improvement in Hubs for Carriages, &c.; and I do hereby declare that the following is a full, clear, and exact description of the same, reference being had to the accompanying drawings and to the letters of reference marked thereon.

Figure 1, shows a vertical longitudinal section through the hub. Fig. 2, shows an end view of the hub A, with the axle G, and box B, removed showing the mortises in the hub, in which pass the feathers D, D, of the box B.

The nature of my invention consists in casting upon the butt end of the box an annular flange with a concave recess formed on its inner surface and driving this into the hub and screwing upon the opposite end of the box a metallic nut having a flange upon its inner surface which projects into a corresponding cavity in the hub as hereinafter described.

The hub A, is composed of wood with a metallic center or box B, in which the axle G, turns. This box B, has an annular enlargement C, upon its butt end the periphery of which is made slightly tapering so as to fit the butt end of the hub tight when driven in the same. The inside of this enlargement C, is grooved, forming a flange $a$, which is snugly filled up by the timber of the hub.

D, D, are feathers cast on each side of the box B, to prevent its turning in the hub. On the outer end of the box B, which box tapers from the hub end, and passes nearly through the hub, is cut a screw thread upon which is screwed a nut F, which when screwed up tight draws the box B, firmly in the hub and secures it rigidly in its place; on the inner end of this is a flange $b$, which fits into a corresponding cavity, in the hub. This nut F, and also the enlargement C, fits into the hub flush with its ends. When the box has thus been placed in the hub the axle G, is passed through it, a nut H, is then placed upon screw I, and the axle secured in its place, the annular collar J, fitting in a recess E, keeps the whole entirely free from dust and dirt.

It will be seen by the above description that the putting together of the several parts to form the hub is easily effected and the parts themselves, are very simple, while I effectually obviate the difficulties attendant upon oil, used for lubrication getting into the hub and between the hub and box which in a short time renders the whole loose and useless.

I do not claim a square shoulder cast upon the end of the box B, nor a like one screwed upon the opposite end of the same for this is seen in carriage hubs in common use, but—

What I claim as my invention and desire to secure by Letters Patent, is,—

The enlargement C, upon box B, having an annular flange $a$, for the purposes specified, in combination with the nut F, and its flange $b$, when the same are both arranged substantially as, and for the purposes herein set forth.

JESSE PRUETTE.

Witnesses:
 IRA H. FITCH,
 ORAMEL CALKINS.